(12) United States Patent
Lee

(10) Patent No.: US 8,564,567 B2
(45) Date of Patent: Oct. 22, 2013

(54) ELECTROPHORETIC DISPLAY DEVICE USING PHOTO SENSOR

(75) Inventor: Jong-Kwon Lee, Anyang (KR)

(73) Assignee: LG Display Co. Ltd., Seoul (KR)

( * ) Notice: Subject to any disclaimer, the term of this patent is extended or adjusted under 35 U.S.C. 154(b) by 701 days.

(21) Appl. No.: 12/629,146

(22) Filed: Dec. 2, 2009

(65) Prior Publication Data
US 2010/0156849 A1   Jun. 24, 2010

(30) Foreign Application Priority Data

Dec. 19, 2008  (KR) .................. 10-2008-0130693

(51) Int. Cl.
*G06F 3/042* (2006.01)
*G09G 3/34* (2006.01)

(52) U.S. Cl.
USPC ............................................. 345/175; 345/7

(58) Field of Classification Search
None
See application file for complete search history.

(56) References Cited

U.S. PATENT DOCUMENTS

| | | | | |
|---|---|---|---|---|
| 7,355,784 B2 * | 4/2008 | Kim | ............................... | 359/296 |
| 7,499,210 B2 * | 3/2009 | Toyoda | ........................ | 359/296 |
| 7,760,419 B2 * | 7/2010 | Lee | ................................. | 359/296 |
| 7,961,171 B2 * | 6/2011 | Miyasaka et al. | ............. | 345/104 |

FOREIGN PATENT DOCUMENTS

| | | |
|---|---|---|
| CN | 101169567 A | 4/2008 |
| KR | 10-2009-0004282 | 1/2009 |
| WO | 2008/018016 A1 | 2/2008 |

OTHER PUBLICATIONS

Office Action issued in corresponding British Patent Application No. 0922080.7; issued Apr. 23, 2010.
Office Action issued in corresponding Chinese Patent Application No. 200910252839.3, mailed Nov. 5, 2012.

* cited by examiner

*Primary Examiner* — K. Wong
(74) *Attorney, Agent, or Firm* — Brinks Hofer Gilson & Lione

(57) ABSTRACT

The present disclosure relates to a touch-type electrophoretic display device using a photo sensor, and the construction thereof may be configured by including a display substrate including a switching element connected to a gate line and a data line intersected with the gate line, a pixel electrode electrically connected to the switching element, and a first and a second photo sensor elements having a different channel width and length, the first and the second photo sensor elements being connected to the gate line and the data line for sensing an amount of light; and an electrophoretic film including charged particles, the electrophoretic film being coupled to the display substrate.

9 Claims, 4 Drawing Sheets

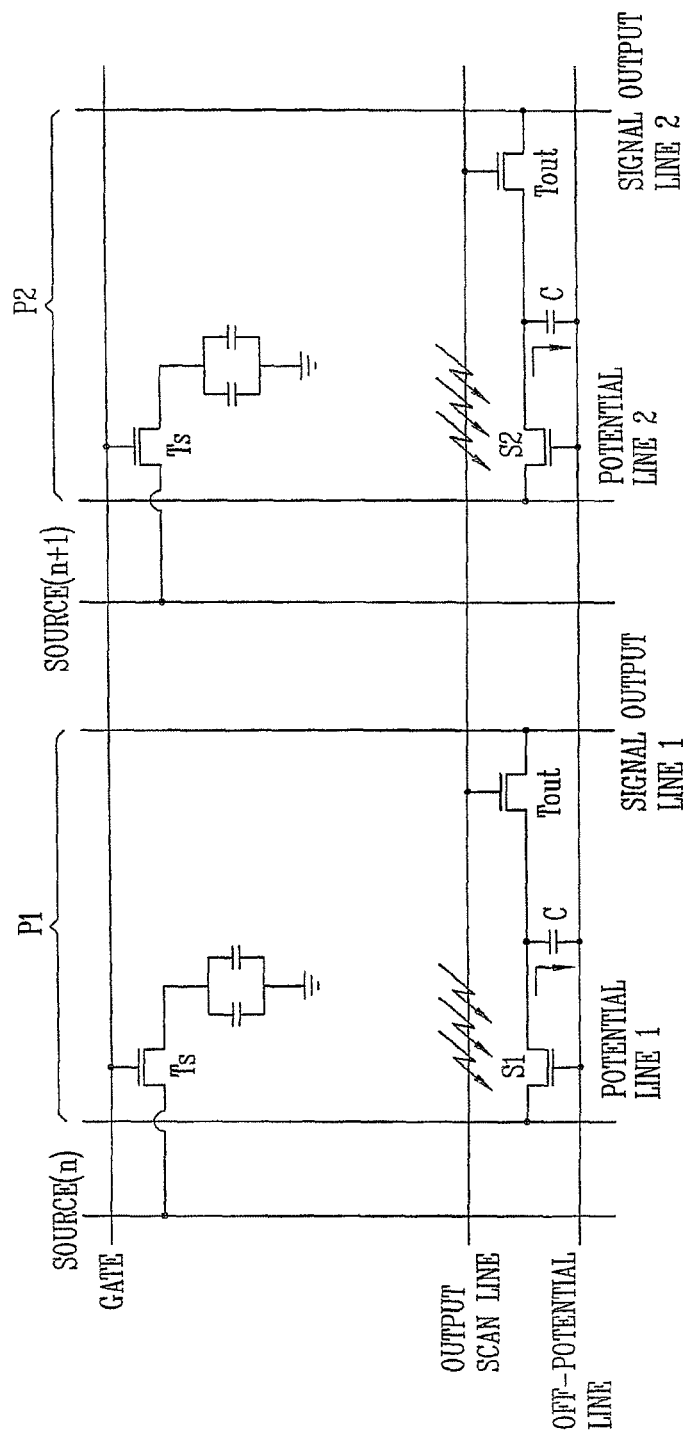

ELECTROPHORETIC DISPLAY DEVICE USING PHOTO SENSOR

CROSS-REFERENCE TO RELATED APPLICATIONS

Pursuant to 35 U.S.C. §119(a), this application claims the benefit of earlier filing date and right of priority to Korean Application No. 10-2008-0130693 filed on Dec. 19, 2008, the contents of which are incorporated by reference herein in its entirety.

BACKGROUND

1. Field of the Disclosure

The present disclosure relates to an electrophoretic display device, and more particularly, to an eletrophoretic display device using a photo sensor in which a touch can be recognized any time by using photo sensors having a different channel width/length even if the peripheral illumination environment is changed.

2. Description of the Related Art

In general, an electrophoretic display device is an image display device using a phenomenon that colloidal particles move to either one of the polarities when one pair of electrodes to which a voltage is applied are immersed into a colloidal solution. The electrophoretic display device is a device in which a backlight is not used, having characteristics such as wide viewing angle, high reflectivity, high readability, low power consumption, and the like, thereby being anticipated as electronic paper.

The electrophoretic display device has a structure in which an electrophoretic film is interposed between two electrodes, and at least one of the two electrodes should be transparent to display images in a reflective mode.

When a pixel electrode is formed on a lower substrate of the two substrates and a potential is applied to the pixel electrode, charged particles within the electrophoretic film move to the pixel electrode or an opposite electrode thereof, thereby allowing images to be observed through a viewing sheet.

In addition to an electrophoretic display device using this principle, there is an in-cell touch-type electrophoretic display device in which photo sensors using the photo current of an amorphous silicon TFT are arranged on an element array, thereby sensing the photo current formed by light entering through an electronic ink film.

A touch-type electrophoretic display device using the foregoing photo sensor according to the related art will be described with reference to FIGS. 1 and 2.

FIG. 1 is a cross-sectional view schematically illustrating a touch-type electrophoretic display device using a photo sensor according to the related art. (Note: reference sign "50" in FIG. 1 is not recorded in the Description. It is suggested to delete "50" in FIG. 1).

FIG. 2 is a circuit diagram illustrating a touch-type electrophoretic display device using a photo sensor according to the related art.

Referring to FIG. 1, a touch-type electrophoretic display device using a photo sensor according to the related art includes a display substrate 11 formed with a switching element (Ts), a pixel electrode 29, a storage capacitor (not shown), a photo sensor element (S), and an output element (Tout), and an electrophoretic film 41 interposed therebetween on the display substrate 11.

The electrophoretic display device having the foregoing construction represents colors by moving black particles 45 or white particles 47 within the electrophoretic film 41 based on the polarity of the potential applied to the pixel electrode 29.

At this time, charged particles in the electrophoretic film 41 moves upward or downward by a potential difference between the pixel electrode 29 and a common electrode (not shown) by applying positive (+) or negative (−) direct current (DC) potential to the common electrode (not shown).

On the other hand, gate lines (not shown) for transferring scan signals and data lines (not shown) for transferring image data signals to actively drive a plurality of elements, for example, a photo sensor element (S), a switching element (Ts), and an output element (Tout), are provided on the lower substrate 11.

The gate and data lines intersect each other to define a unit pixel, and each unit pixel includes a photo sensor element (S), a switching element (Ts), an output element (Tout), and a storage capacitor (Cst), thereby functioning to control the polarity of the potential applied to each electrode and storing potential energy in the electrode.

Furthermore, the switching element (Ts) and output element (Tout) further include a pixel electrode 29 for applying an electric field to the electrophoretic film 41, and a protective film 25 formed with a low dielectric substance is interposed between the switching element (Ts) and output element (Tout), and the pixel electrode 29.

Furthermore, the photo sensor element (S) and switching element (Ts), and the output element (Tout), provided on the each unit pixel, include a gate electrode 13 branched from the gate line (not shown), a gate insulation film 15 formed on the gate electrode 13, an active layer 17 and an ohmic contact layer (not shown) laminated on the gate electrode 13, a source and a drain electrodes 21, 23 branched from the data line (not shown) and formed on the active layer 17. Here, the drain electrodes 23 of the switching element (Ts) and output element (Tout) are connected to the pixel electrode 29.

On the other hand, the electrophoretic film 41 is made of a base film 49, microcapsules 43, and an adhesive film 33, and laminated on the display substrate 11.

When an electric field is applied to the electrophoretic film 41 having the foregoing construction, pigment particles having a different color move in an opposite direction to each other, thereby dividing the inside of a microcapsule 43 into two regions having a different color.

A touch-type electrophoretic display device using a photo sensor having the foregoing construction according to the related art, referring to FIG. 2, the gate and source of a photo sensor element (S) are connected to an off-potential line and a potential line, respectively.

Furthermore, the drain electrode, which is an output terminal, is connected to a signal capacitor (C) and an input terminal (source) of the output element (Tout).

Furthermore, the photo current formed by light entering to a channel portion of the photo sensor element (S) flows in a direction of the signal capacitor (C) and output element (Tout) by a voltage applied to the potential line, and the signal capacitor (C) stores it as a signal potential.

On the other hand, another polarity of the signal capacitor (C) is connected to an off-potential line, and the off-potential line functions to form a predetermined amount of photo current by maintaining an off-potential in the photo sensor element (S).

Furthermore, the output element (Tout) is also a three-terminal element, and the control terminal (G) and output terminal (drain) thereof are connected to an output scan line and a signal output line, respectively.

Furthermore, when an on-potential is applied to an output scan line of the output element (Tout), it functions to output a signal potential stored in the signal capacitor (C) to the signal output line to read touch information.

However, a touch-type electrophoretic display device using a photo sensor according to the related art has a problem as follows.

When the photo sensor is formed by using an amorphous silicon element, or the like, a level of photo current generated at the relevant voltage is determined based on the width and length of a determined channel.

If the channel width becomes wider, photo current will be increased so that the photo current values will be saturated at a high illumination level, thereby limiting the performance of touch recognition.

On the other hand, if the channel width becomes narrower, photo current will be reduced so that the photo sensing output will be weakened, thereby similarly limiting the performance of touch recognition.

Due to the above-mentioned reasons, in case of a reflective-type electrophoretic display device according to the related art, insufficient photo current will be generated if ambient light is too dark whereas too much photo current will be generated to saturate the sensing output if it is too bright, thereby causing a touch recognition problem.

As a result, according to a touch method using the photo sensor according to the related art, a photo sensor element having a determined channel width and length is used, and thus it all the time creates an illumination region where a touch cannot be recognized based on its external illumination environment, thereby becoming a restraining factor in the manufacturing aspect.

SUMMARY

A touch-type electrophoretic display device using a photo sensor includes a display substrate including a switching element connected to a gate line and a data line intersected with the gate line, a pixel electrode electrically connected to the switching element, and a first and a second photo sensor elements having a different channel width and length, the first and the second photo sensor elements being connected to the gate line and the data line for sensing an amount of light; and an electrophoretic film including charged particles, the electrophoretic film being coupled to the display substrate.

A touch-type electrophoretic display device using a photo sensor includes a display substrate including a gate line and a data line intersected with each other, a switching element disposed at each pixel defined by the gate line, a pixel electrode electrically connected to the switching element, and either one of a first and a second photo sensor elements having a different channel width and length, the first and the second photo sensor elements being connected to the gate line and the data line for sensing an amount of light, wherein the first photo sensor element is arranged at odd-numbered pixels and the second photo sensor element is arranged at even-numbered pixels; and an electrophoretic film including charged particles, the electrophoretic film being coupled to the display substrate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a circuit diagram illustrating a touch-type electrophoretic display device using a sensor according to another embodiment of the present disclosure.

DETAILED DESCRIPTION OF THE INVENTION

Hereinafter, a touch-type electrophoretic display device using a photo sensor according to a preferred embodiment of the present invention will be described in detail with reference to the accompanying drawings.

Figure 1:
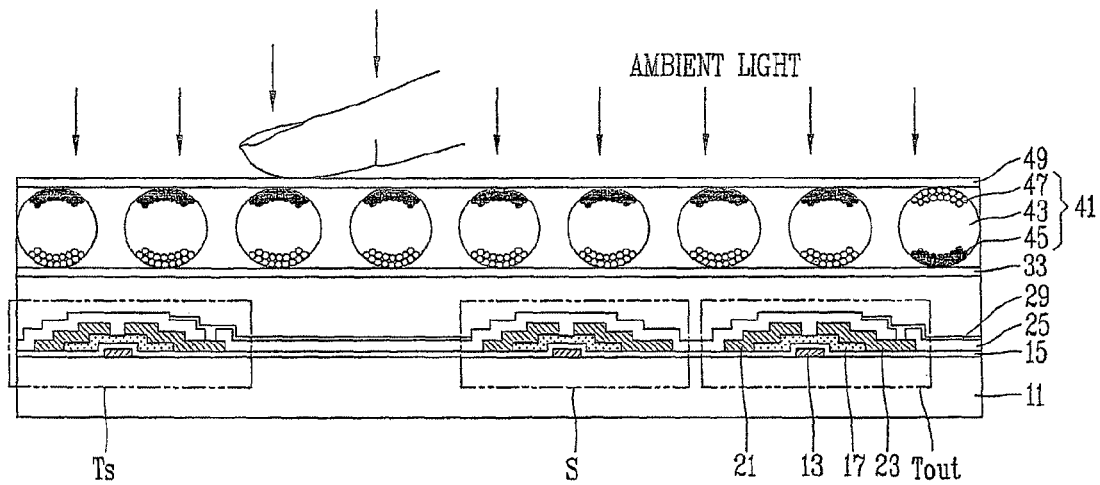
FIG. 1 is a cross-sectional view schematically illustrating a touch-type electrophoretic display device using a photo sensor according to the related art.
Figure 2:
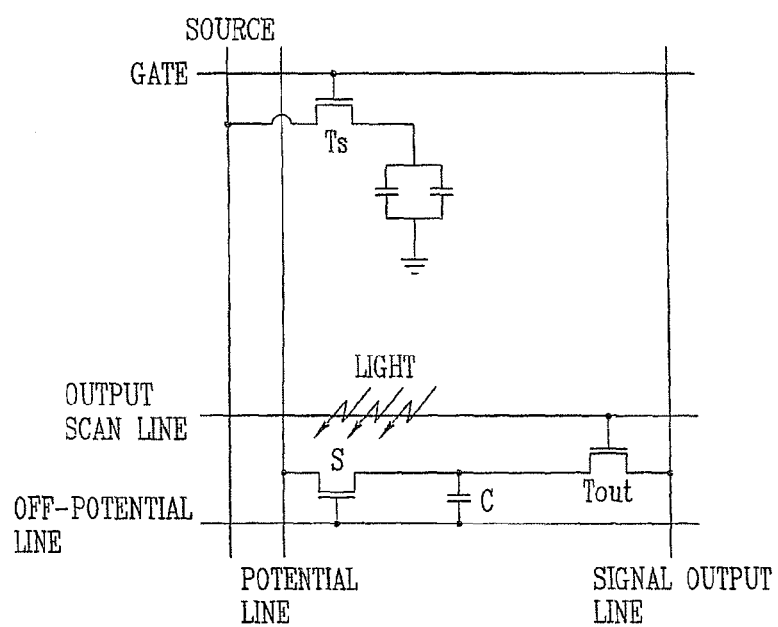
FIG. 2 is a circuit diagram illustrating a touch-type electrophoretic display device using a photo sensor according to the related art.
Figure 3:
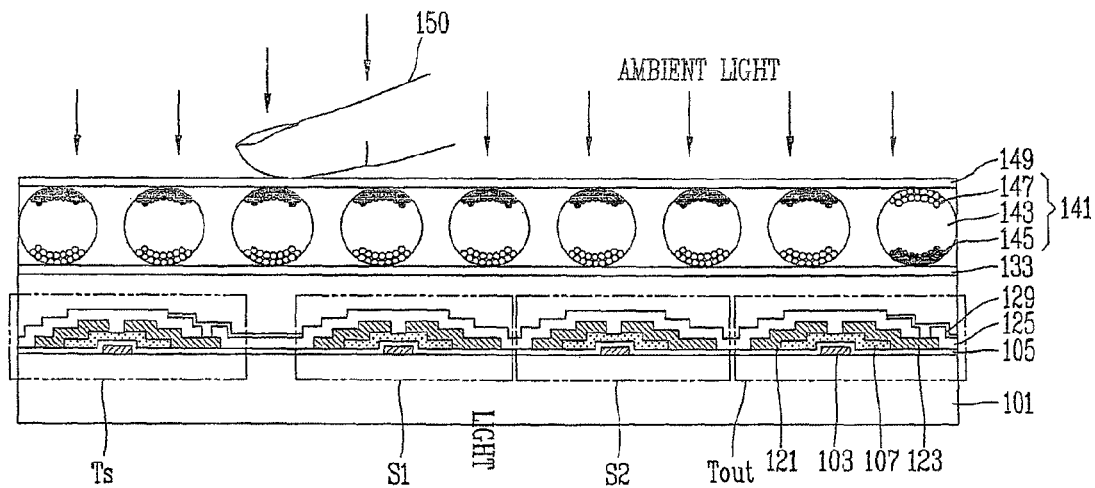
FIG. 3 is a cross-sectional view schematically illustrating a touch-type electrophoretic display device using a photo sensor according to an embodiment of the present disclosure.

FIG. 3 is a cross-sectional view schematically illustrating a touch-type electrophoretic display device using a photo sensor according to an embodiment of the present disclosure.

Figure 4:
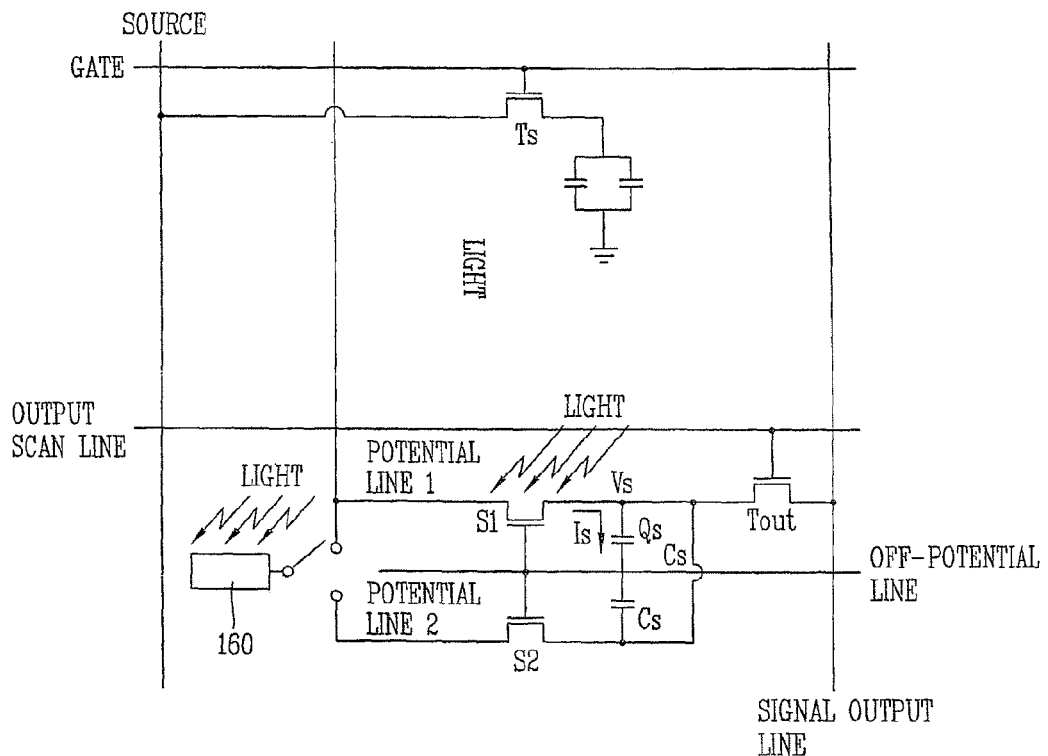
FIG. 4 is a circuit diagram illustrating a touch-type electrophoretic display device using a photo sensor according to an embodiment of the present disclosure in the case where it is connected to another photo sensor using a photo switch based on changed peripheral illumination.

FIG. 4 is a circuit diagram illustrating a touch-type electrophoretic display device using a photo sensor according to an embodiment of the present disclosure in the case where it is connected to another photo sensor using a photo switch based on changed peripheral illumination.

Referring to FIG. 3, a touch-type electrophoretic display device using a photo sensor according to the present disclosure includes a display substrate 101 formed with a switching element (Ts), a pixel electrode 129, a storage capacitor (not shown), a first and a second photo sensor elements (S1, S2), and an output element (Tout), and an electrophoretic film 141 interposed therebetween on the display substrate 101.

The electrophoretic display device having the foregoing construction represents colors by moving black particles 145 or white particles 147 within the electrophoretic film 141 based on the polarity of the potential applied to the pixel electrode 129.

At this time, charged particles in the electrophoretic film 141 moves upward or downward by a potential difference between the pixel electrode 129 and a common electrode (not shown) by applying positive (+) or negative (−) direct current (DC) potential to the common electrode (not shown). In particular, the positive (+) or negative (−) direct current (DC) potential is applied to the common electrode and thus a potential difference from the pixel electrode 129 becomes larger, thereby allowing charged particles to move more rapidly within the electrophoretic film 141.

On the other hand, gate lines (not shown) for transferring scan signals and data lines (not shown) for transferring image data signals to actively drive a plurality of elements, for example, a first and a second photo sensor elements (S1, S2), a switching element (Ts), and an output element (Tout), are provided on the display substrate 101.

The gate and data lines intersect each other to define a unit pixel, and each unit pixel includes a first and a second photo sensor elements (S1, S2), a switching element (Ts), an output element (Tout), and a storage capacitor (Cst), thereby functioning to control the polarity of the potential applied to each electrode and storing potential energy in the electrode.

Furthermore, the switching element (Ts) and output element (Tout) further include a pixel electrode 129 for applying an electric field to the electrophoretic film 141, and a protective film 125 formed with a low dielectric substance is interposed between the switching element (Ts) and output element (Tout), and the pixel electrode 129.

Furthermore, the first and the second photo sensor elements (S1, S2), and switching element (Ts) and the output element (Tout), provided on the each unit pixel, include a gate electrode 103 branched from the gate line (not shown), a gate insulation film 105 formed on the gate electrode 103, an active layer 107 and an ohmic contact layer (not shown) laminated on the gate electrode 103, a source and a drain electrodes 121, 123 branched from the data line (not shown) and formed on the active layer 107. Here, the drain electrodes 123 of the switching element (Ts) and output element (Tout) are connected to the pixel electrode 129.

Furthermore, though not shown in the drawing, the storage capacitor (Cst) includes a capacitor lower electrode (not shown) and a capacitor upper electrode (not shown), which is overlapped with the capacitor lower electrode by interposing a gate insulation film 105 therebetween, and it functions to store photo current flowing when light provided from the outside is diffusively reflected from the electrophoretic film 141 during a process of copying an image to excite the active layer 107 as well as functioning to prevent a reduced image quality caused by parasitic capacity by maintaining a potential charged to the electrophoretic film 141 during the turn-off section of the switching element (Ts) when displaying an image.

On the other hand, the electrophoretic film 141 is made of a base film 149, microcapsules 143, and an adhesive film 133, and laminated on the display substrate 101. At this time, it may be formed by coating and curing a polymer compound including the microcapsules and binders on the display substrate 101.

Here, the microcapsules 143 are formed with a size of diameter about less than 100 μm, and therein ionized pigment particles having black and white colors are mixed with one another and then formed into capsules, and at this time, they are formed into capsules half-and-half by positive (+) charged white pigment particles 147 and negative (−) charged black pigment particles 145, or formed into capsules in a converse manner. In other words, particles having a different color from each other within a microcapsule 143 are charged by a different electrode from each other.

When an electric field is applied to the electrophoretic film 141 having the foregoing construction, pigment particles having a different color move in an opposite direction to each other, thereby dividing the inside of a microcapsule 143 into two regions having a different color.

A touch-type electrophoretic display device using a photo sensor formed with the foregoing construction according to the present invention, referring to FIG. 4, the gates of the first and the second photo sensor elements (S1, S2) are commonly connected to an off-potential line, and their input terminals (sources) are connected to different potential lines 1, 2, respectively, and their output terminals (drains) are connected to a signal capacitor (C) and an output element (Tout), respectively.

Furthermore, when a touch-type electrophoretic display device is used by a user 150, photo current formed by selectively operating the first or the second photo sensor element (S1 or S2), which is selected through a photo switch 160 based on an amount of the peripheral illumination, flows in a direction of the signal capacitor (C) and output element (Tout) by a voltage applied to the potential line, and the signal capacitor (C) stores it as a signal potential.

On the other hand, another polarity of the signal capacitor (C) is connected to an off-potential line, and the off-potential line functions to form a predetermined amount of photo current by maintaining an off-potential in the first or the second photo sensor element (S1 or S2).

Furthermore, the output element (Tout) is also a three-terminal element, and the control terminal (G) and output terminal (drain) thereof are connected to an output scan line and a signal output line, respectively.

Furthermore, when an on-potential is applied to an output scan line of the output element (Tout), it functions to output a signal potential stored in the signal capacitor (C) to the signal output line to read touch information.

Here, the first and the second photo sensor elements (S1, S2) having a different channel width and length from each other are arranged for each unit pixel. Here, in case where a reference level of the peripheral illumination is set to 1000 lux, the first photo sensor element (S1) having a narrow channel width will be used if the peripheral illumination is greater than 1000 lux, and the second photo sensor element (S2) having a wide channel width will be used if the peripheral illumination is less than 1000 lux.

Here, the reference level of the peripheral illumination is defined as 1000 lux according to the present invention, but it should be understood that the reference level may be changed according to circumstances. Moreover, it should be understood that the width of a channel is not specifically disclosed here since it may vary based on the size of the element. In addition, a case where channels having a different width from each other are used is described here, but it should be also understood that channels having a different length instead of a different width can be used. Accordingly, a touch operation is enabled at any illumination environments by manipulating a photo switch 160 based on its changed peripheral illumination to selectively use photo sensor elements (S1, S2) having a different channel width and length from each other.

On the other hand, a touch-type electrophoretic display device using a photo sensor according to another embodiment of the present disclosure will be described in detail with reference to the accompanying drawings.

Figure 5:
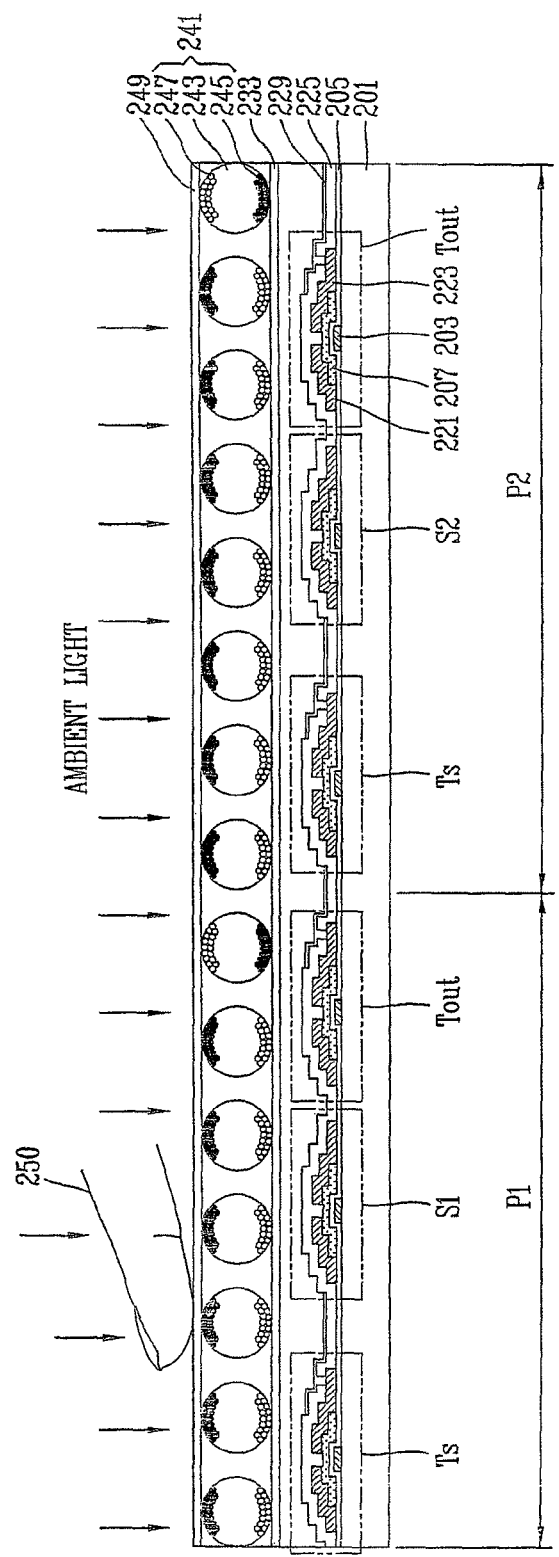
FIG. 5 is a cross-sectional view schematically illustrating a touch-type electrophoretic display device using a sensor according to another embodiment of the present disclosure.

FIG. 5 is a cross-sectional view schematically illustrating a touch-type electrophoretic display device using a sensor according to another embodiment of the present disclosure.

FIG. 6 is a circuit diagram illustrating a touch-type electrophoretic display device using a sensor according to another embodiment of the present invention.

Referring to FIG. 5, a touch-type electrophoretic display device using a photo sensor according to an another embodiment of the present invention includes a display substrate 201 formed with a switching element (Ts), a pixel electrode 229, a storage capacitor (not shown), a first and a second photo sensor elements (S1, S2), and an output element (Tout), and an electrophoretic film 241 interposed therebetween on the display substrate 201.

The electrophoretic display device having the foregoing construction represents colors by moving black particles 245 or white particles 247 within the electrophoretic film 241 based on the polarity of the potential applied to the pixel electrode 229.

At this time, charged particles in the electrophoretic film 241 moves upward or downward by a potential difference between the pixel electrode 229 and a common electrode (not shown) by applying positive (+) or negative (−) direct current (DC) potential to the common electrode (not shown). In particular, the positive (+) or negative (−) direct current (DC) potential is applied to the common electrode and thus a potential difference from the pixel electrode 229 becomes larger, thereby allowing charged particles to move more rapidly within the electrophoretic film 241.

On the other hand, gate lines (not shown) for transferring scan signals and data lines (not shown) for transferring image data signals to actively drive a plurality of elements, for example, a first and a second photo sensor elements (S1, S2), a switching element (Ts), and an output element (Tout), are provided on the display substrate 201.

The gate and data lines intersect each other to define a unit pixel, and each unit pixel includes either one of a first and a second photo sensor elements (S1, S2), a switching element (Ts), an output element (Tout), and a storage capacitor (Cst).

Here, either one of a first and a second photo sensor elements is disposed at the each unit pixel such that the first photo sensor element (S1) is disposed at odd-numbered pixels (P1) and the second photo sensor element (S2) is disposed at even-numbered pixels (P2). At this time, the first photo sensor element (S1) and the second photo sensor element (S2) have a different channel width (W) and length (L) from each other.

Furthermore, the switching element (Ts) and output element (Tout) further include a pixel electrode 229 for applying an electric field to the electrophoretic film 241, and a protective film 225 formed with a low dielectric substance is disposed between the switching element (Ts) and output element (Tout), and the pixel electrode 229.

Furthermore, the first or the second photo sensor element (S1, S2) and switching element (Ts) and the output element (Tout) provided on the each unit pixel include a gate electrode 203 branched from the gate line (not shown), a gate insulation film 205 formed on the gate electrode 203, an active layer 207 and an ohmic contact layer (not shown) laminated on the gate electrode 203, a source and a drain electrodes 221, 223 branched from the data line (not shown) and formed on the active layer 207. Here, the drain electrodes 223 of the switching element (Ts) and output element (Tout) are connected to the pixel electrode 229.

Furthermore, though not shown in the drawing, the storage capacitor (Cst) includes a capacitor lower electrode (not shown) and a capacitor upper electrode (not shown), which is overlapped with the capacitor lower electrode by interposing a gate insulation film 205 therebetween, and it functions to store photo current flowing when light provided from the outside is diffusively reflected from the electrophoretic film 241 during a process of copying an image to excite the active layer 207 as well as functioning to prevent a reduced image quality caused by parasitic capacity by maintaining a potential charged to the electrophoretic film 241 during the turn-off section of the switching element (Ts) when displaying an image.

On the other hand, the electrophoretic film 241 is made of a base film 249, microcapsules 243, and an adhesive film 233, and laminated on the display substrate 201. At this time, it may be formed by coating and curing a polymer compound including the microcapsules and binders on the display substrate 201.

Here, the microcapsules 243 are formed with a size of diameter about less than 100 μm, and therein ionized pigment particles having black and white colors are mixed with one another and then formed into capsules, and they are formed into capsules half-and-half by positive (+) charged white pigment particles 247 and negative (−) charged black pigment particles 245, or formed into capsules in a converse manner. In other words, particles having a different color from each other within a microcapsule 243 are charged by a different electrode from each other.

When an electric field is applied to the electrophoretic film 241 having the foregoing construction, pigment particles having a different color move in an opposite direction to each other, thereby dividing the inside of a microcapsule 243 into two regions having a different color.

A touch-type electrophoretic display device using a photo sensor formed with the foregoing construction according to another embodiment of the present invention, referring to FIG. 6, the gate of the first photo sensor elements (S1) disposed at odd-numbered pixels (P1) and the gate of the second photo sensor elements (S2) disposed at even-numbered pixels (P2) are commonly connected to an off-potential line, respectively, and their input terminals (sources) are connected to different potential lines 1, 2, respectively, and their output terminals (drains) are connected to a signal capacitor (C) and an output element (Tout), respectively.

Furthermore, though not shown in the drawing, when a touch-type electrophoretic display device is used by a user 250 (Note: "150" in FIG. 5 should be "250"), photo current formed by selectively operating the first or the second photo sensor element (S1 or S2), which is selected through a photo switch (not shown) based on an amount of the peripheral illumination, flows in a direction of the signal capacitor (C) and output element (Tout) by a voltage applied to the potential line, and the signal capacitor (C) stores it as a signal potential.

On the other hand, another polarity of the signal capacitor (C) is connected to an off-potential line, and the off-potential line functions to form a predetermined amount of photo current by maintaining an off-potential in the first or the second photo sensor element (S1 or S2).

Furthermore, the output element (Tout) is also a three-terminal element, and the control terminal (G) and output terminal (drain) thereof are connected to an output scan line and different signal output lines 1, 2, respectively.

Furthermore, when an on-potential is applied to an output scan line of the output element (Tout), it functions to output a signal potential stored in the signal capacitor (C) to the signal output line to read touch information.

Here, the first photo sensor element (S1) disposed at odd-numbered pixels (P1) and the second photo sensor element (S2) disposed at even-numbered pixels (P2), similarly to an embodiment of the present invention as described above, are arranged with a different channel width and length from each other. Here, in case where a reference level of the peripheral illumination is set to 1000 lux, the first photo sensor element (S1) disposed at odd-numbered pixels (P1) having a narrow channel width will be used if the peripheral illumination is greater than 1000 lux, and the second photo sensor element (S2) disposed at even-numbered pixels (P2) having a wide channel width will be used if the peripheral illumination is less than 1000 lux.

Here, the reference level of the peripheral illumination is defined as 1000 lux according to the present invention, but it should be understood that the reference level may be changed according to circumstances. Moreover, it should be understood that the width of a channel is not specifically disclosed here since it may vary based on the size of the element. In addition, a case where channels having a different width from each other are used is described here, but it should be also understood that channels having a different length instead of a different width can be used.

In this manner, a touch operation is enabled at any illumination environments by manipulating a photo switch (not shown) based on its changed peripheral illumination to selectively use photo sensor elements (S1, S2) having a different channel width and length from each other, which are disposed at odd-numbered pixels and even-numbered pixels.

According to the present disclosure, it may be possible to enhance the ratio of touch recognition by applying a photo sensor method to flat panel displays in addition to a reflective electrophoretic display device.

As described above, according to an eletrophoretic display device using a photo sensor, it may be possible to perform a touch recognition at any time by using photo sensors having a different channel width/length even if the peripheral illumination environment is changed, thereby overcoming the problem of a changed touch recognition ratio based on its peripheral illumination, which has created difficulties in case of an in-cell type photo sensor.

Furthermore, according to the present invention, an optimized photo sensor that can be implemented by an in-cell method may be provided to a reflective electrophoretic display device, thereby having an effect of reducing the cost through simplifying the processes, as well as improving the characteristics of reflectivity and contrast ratio of the panel due to the reduced transmittance of incident light on a touch screen thereof, compared to a touch panel produced by attaching the existing touch screen to a front surface of the panel.

Though the present invention is described with reference to preferred embodiments, various modifications and improvements will become apparent to those skilled in the art without departing from the spirit and scope of the present invention as defined in the following claims.

What is claimed is:

1. A touch-type electrophoretic display device, the device comprising:
    a display substrate including a switching element connected to a gate line and a data line intersected with the gate line, a pixel electrode electrically connected to the switching element, and a first and a second photo sensor elements having a different channel width and length, the first and the second photo sensor elements being connected to the gate line and the data line for sensing an amount of light, wherein the first and the second photo sensor elements are commonly connected to an off-potential line; and
    an electrophoretic film including charged particles, the electrophoretic film being coupled to the display substrate.

2. The touch-type electrophoretic display device of claim 1, wherein the display substrate includes an output element for outputting a sensing signal corresponding to the sensed amount of light, the output element being electrically connected to the first and the second photo sensor elements.

3. The touch-type electrophoretic display device of claim 1, wherein the display substrate includes a photo switch selectively connected to the first and the second photo sensor elements based on its changed peripheral illumination.

4. The touch-type electrophoretic display device of claim 3, wherein a first photo sensor element having a narrow channel width and length is used if the peripheral illumination is greater than 1000 lux, and a second photo sensor element having a wide channel width and length is used if the peripheral illumination is less than 1000 lux.

5. The touch-type electrophoretic display device of claim 1, wherein the first and the second photo sensor elements are arranged at each unit pixel.

6. A touch-type electrophoretic display device, the device comprising:
    a display substrate including a gate line and a data line intersected with each other, a switching element disposed at each pixel defined by the gate line, a pixel electrode electrically connected to the switching element, and either one of a first and a second photo sensor elements having a different channel width and length, the first and the second photo sensor elements being connected to the gate line and the data line for sensing an amount of light, wherein the first photo sensor element is arranged at odd-numbered pixels and the second photo sensor element is arranged at even-numbered pixels, and the first and the second photo sensor elements are commonly, connected to an off-potential line; and
    an electrophoretic film including charged particles, the electrophoretic film being coupled to the display substrate.

7. The touch-type electrophoretic display device of claim 6, wherein the display substrate includes an output element for outputting a sensing signal corresponding to the sensed amount of light, the output element being electrically connected to the first and the second photo sensor elements.

8. The touch-type electrophoretic display device of claim 6, wherein the display substrate includes a photo switch selectively connected to the first and the second photo sensor elements based on its changed peripheral illumination.

9. The touch-type electrophoretic display device of claim 6, wherein a first photo sensor element having a narrow channel width and length is used if the peripheral illumination is greater than 1000 lux, and a second photo sensor element having a wide channel width and length is used if the peripheral illumination is less than 1000 lux.

* * * * *